(No Model.)
F. X. BYERLEY.
PURIFYING VEGETABLE OILS AND SEPARATING THE SAME FROM SOLVENTS.
No. 246,075. Patented Aug. 23, 1881.
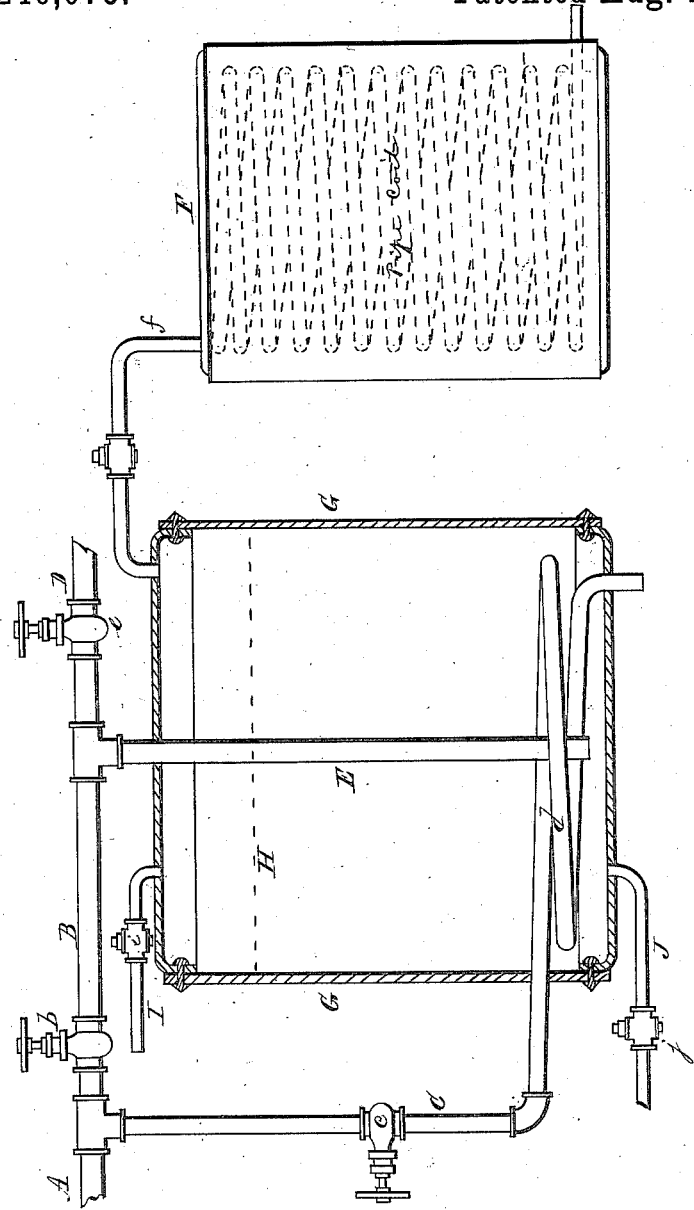
Witnesses.
R. W. Thompson
J. H. Burridge.
Inventor.
F. X. Byerley
W. H. Burridge
Atty.

UNITED STATES PATENT OFFICE.

FRANCIS X. BYERLEY, OF CLEVELAND, OHIO.

PURIFYING VEGETABLE OILS AND SEPARATING THE SAME FROM SOLVENTS.

SPECIFICATION forming part of Letters Patent No. 246,075, dated August 23, 1881.

Application filed July 29, 1881. (No model.)

*To all whom it may concern:*

Be it known that I, FRANCIS X. BYERLEY, of Cleveland, in the county of Cuyahoga and State of Ohio, have invented certain new and useful improvements in purifying vegetable oils and separating the same from solvents used in extracting them from seeds and other oleaginous substances, which improvements are fully set forth in the following specification.
The invention relates more particularly to the purification of oil that has been extracted from cotton-seed, linseed, or other seeds or oleaginous substances by a solvent—gasoline, for example—in any ordinary or suitable way.
It has for its object to obtain the oil in a pure, dry condition, free from albuminous or mucilaginous matters, from water, and from the solvent used in its extraction, and to attain these results in an efficient and expeditious manner.

If free steam be passed through and into intimate contact with a body of such oil or solution of oil, not only is the solvent thoroughly expelled—a result accomplished with difficulty by dry heat alone—but the albuminous or mucilaginous matters are coagulated, so that they readily and quickly settle. In this operation, however, the steam condenses more or less, and the condensed water forms with the oil an intimate mixture or emulsion which does not readily separate by standing.

The present invention consists in effecting the separation of the water from such intimate mixtures or emulsions of oil and water with the aid of an air-blast, or the combined action of heat and air currents, and in the improved process for purifying oils, comprising, in combination, the treatment of the oil with free steam and the decomposition of the emulsion or intimate mixture of oil and water resulting from this operation, in the manner indicated.

This invention relates to that class of processes used in the extracting oils, such as linseed and cotton-seed oils, from seeds and other oleaginous substances by means of solvents, and refers more particularly to that part of such processes which has for its object the separation of the oil, after its extraction from the seed, from the solvent employed; and it consists in producing this separation by evaporating the solvent by the agency of a current of free steam used in connection with dry heat and a current of air.

In carrying out this invention I employ an apparatus as herein described, or equivalent means. The oil, after it is extracted from the seed, and while still mixed with the solvent, is placed in a vessel, (preferably a closed one, connected with a suitable condensing apparatus, in order that the solvent may be recovered after evaporation,) which vessel is provided with a pipe connected with a steam-boiler, so that free steam may be admitted and passed through the mixed oil and solvent, and also with a coil or other device connected with the steam-boiler, through which coil steam may circulate for the purpose of heating the mixture, and with a pipe communicating with an air-blowing engine, through which a current of air can be forced into and through the contents of the vessel. The solution being in this vessel, the free steam is turned on and allowed to circulate through and into intimate contact with the mixture and solvent. This, by heating the mixture to the temperature of the steam, evaporates the solvent, while the oil, on account of its higher boiling-point, is not affected. It also coagulates the albuminous or mucilaginous impurities. The passage of the free steam through the mass is continued until the solvent is all evaporated, by which time, also, the albuminous matters will have been coagulated. It is then turned off. The free steam, however, condenses to some extent in the oil, and the water so produced mixes with the oil and forms an emulsion with it. This emulsion is decomposed by turning steam onto the coil, thereby heating the emulsion, and by forcing a strong current of air through it. This in a very short time—say ten to twenty minutes—if the mixture is warm enough, throws off every particle of steam and leaves the oil bright and pure. The best temperature for this purpose is from 250° to 275° Fahrenheit; but this is not essential, as the same result can be produced at very much lower heats. If for any cause the temperature of the mass decreases to too low a point after the steaming has been completed, it is raised again to the proper point by means of the steam-coil. This heating with the coil may be carried on simultaneously with the passage of the free steam through the mass or after the evaporation of the solvents; but both it and the blast of air are to be continued after the free steam has been shut off, and until the water is all evaporated and the oil left bright and clear. A current of air forced through the mass assists the evaporation, as well of the solvent as of the water, and may for this purpose, when desired, be passed through the blow-pipes into the mass during such evaporation.

Besides removing the solvent thoroughly—a result rarely and with difficulty attained by dry heat alone, as is usually the case when the light hydrocarbons are used as solvents—this process has the further advantage of washing the oils, thus coagulating the albumen and other impurities of like character contained in them in such a manner that they settle readily and quickly.

The accompanying drawing represents, in vertical section, an apparatus that may be used in carrying out the invention.

A is a pipe leading from a steam-boiler and connected with the pipes B C, which are provided with valves b c, so that the passage of steam through them may be regulated or cut off at will. The pipe B is connected with the pipe E, which descends almost to the bottom of the closed vessel G, and also with an air-pipe, D. The pipe D is provided with a valve, e, and serves to convey air from a pump or other suitable apparatus. A condenser, F, is connected with the upper part of the vessel G by a pipe, f.

I is a filling-pipe, and J a draw-off pipe, provided each with a cock, i j, respectively.

In operation the steam from the boiler passes through the pipes A, B, and E into the oil which fills the vessel G to about the dotted line H. The oil is subjected to dry heat, when desired, by passing steam from the pipe A through the pipe C and coil d, and air is blown through the mass by opening the communication between the pipe D and the pipes B E.

Having now fully described the said invention and the manner of carrying the same into effect, I would observe, in conclusion, that the subjection of the oil to intimate contact with free steam, so as to coagulate the mucilaginous or albuminous matter, and the decomposition of the intimate mixture or emulsion of oil and water by dry heat, as well as the process of purifying, comprising the two operations in combination with each other, form no part of this invention, and are not claimed herein, except in connection with a current or blast of air, but are reserved to my application filed December 18, 1879, of which the present application is a division.

What I do claim herein as my invention, and desire to secure by Letters Patent, is—

1. The method of effecting or assisting the removal of water from an emulsion or intimate mixture of oil and water by passing currents of air through the said emulsion, substantially as described.

2. The method of decomposing an emulsion or intimate mixture of oil and water by heating the same and passing currents of air through the said mixture, substantially as set forth.

3. The process of purifying vegetable oils, consisting in passing free steam through and into intimate contact with the body of the oil, and in combination with that operation, as a concomitant or subsequent step in the purification, forcing currents of air through the oil, substantially as described.

4. The process of treating oils that have been extracted by a solvent, consisting in driving off the solvent, and at the same time coagulating the albuminous matters by passing free steam through and into intimate contact with the body of the oil, and removing the water from the emulsion or mixture of oil and water resulting from the steaming operation by currents of air, or by the combined action of heat and air-currents, substantially as set forth.

In testimony whereof I affix my signature in presence of two witnesses.

FRANCIS X. BYERLEY.

Witnesses:
J. H. BURRIDGE,
R. W. THOMPSON.